UNITED STATES PATENT OFFICE 2,015,979

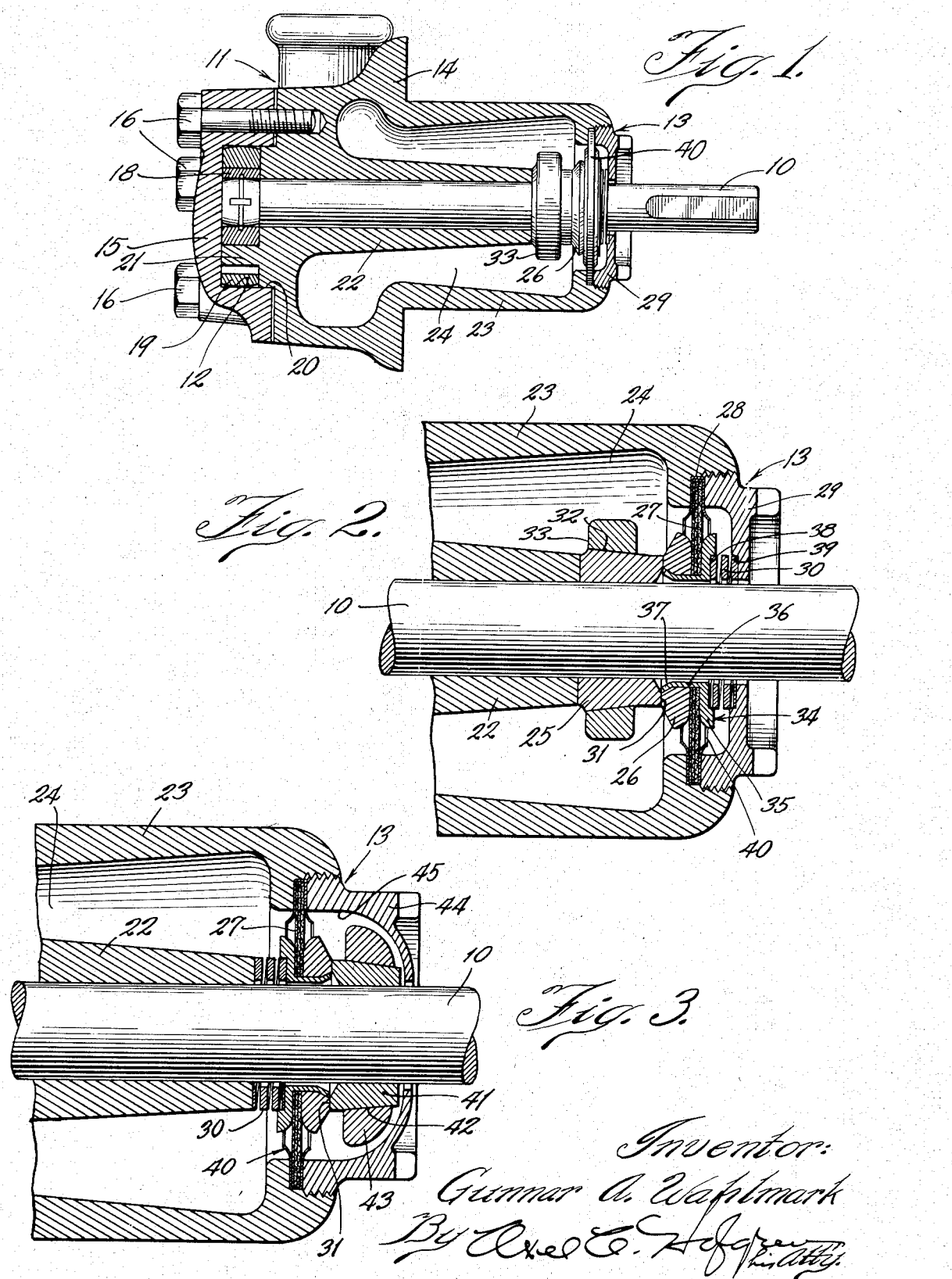

SEAL FOR PUMPS

Gunnar A. Wahlmark, Rockford, Ill.

Application December 30, 1933, Serial No. 704,705

4 Claims. (Cl. 286—11)

The invention relates generally to pumps and more particularly it relates to a mechanical seal construction which prevents leakage of fluids, either liquid or gaseous, along the projecting rotary drive shaft of the pump.

The primary object of the invention is to provide, in connection with the projecting rotary shaft of a pump or the like, a new and improved mechanical seal of simple construction.

Another object is to provide a new and improved seal in which the take-up for wear is automatic so that no adjustment is necessary after it is once installed.

Another object is to provide a mechanical seal with a non-elastic diaphragm of great flexibility so that it is self aligning and will not crystallize due to a slight runout on the seal face.

Another object is to provide, in association with the projecting rotary shaft of a rotary device such as a pump, a fluid-tight mechanical seal embodying a diaphragm so flexible that only a slight spring pressure is required to maintain an effective sealing contact between the sealing members and thereby prolong the life of the seal rings.

Another object is to provide a new and improved mounting for the seal rings of such a mechanical seal.

Other objects and advantages will become apparent from the following description, taken in connection with the accompanying drawing, in which:

Fig. 1 is a sectional view taken along the axis of a rotary pump embodying the features of the invention.

Fig. 2 is an enlarged portion of Fig. 1 showing the elements of the mechanical seal in central longitudinal section along the axis of the shaft.

Fig. 3 is a sectional view similar to Fig. 2 and illustrating an alternative embodiment of the invention.

For purposes of disclosure the preferred form of the invention, together with one alternative embodiment, is illustrated in the drawing and will hereinafter be described in detail as applied to a particular form of pump, but it is to be understood that this disclosure is not intended as a limitation of the invention to pumps, nor to the particular type of pump illustrated. It being contemplated that various changes might be made by those skilled in the art to adapt the invention to other types of rotary apparatus and to other types of pumps without departing from the spirit and scope of the invention as defined by the appended claims.

In the drawing the invention is illustrated as embodied in a pump wherein a horizontal pump shaft 10, rotatably mounted in a casing 11, is operatively connected at one end to rotary pumping mechanism housed within a pumping chamber 12 in the casing, while its other end projects from the casing through a mechanical seal 13 which prevents leakage of fluids from the casing along the shaft. As shown herein the casing 11 comprises a main base casting 14 with an end plate 15 secured thereto by a plurality of screws 16 to form, with the casting 14, the cylindrical pumping chamber 12 into which one end of the shaft 10 projects. Within the chamber 12 a driving member 18 is fixed on the shaft 10 in driving relation to an annular driven member 19 which runs on the eccentrically positioned internal surface of the pump chamber 12. To position the plate 15, an eccentric boss 20 extends a short distance from the base casting 14 into the recess which forms the chamber 12 and a segment 21 projecting from the boss 20 into the crescent-shaped space between the member 18 and the annular member 19 serves to divide said space into suction and pressure chambers (not shown) in a conventional manner.

Between the pump chamber 12 and the mechanical seal 13, the main base casting 14 is formed to provide an elongated bearing hub 22 for the shaft 10, which hub terminates within a radially spaced tubular portion 23 of the casting 14 in which the non-rotatable elements of the mechanical seal 13 are mounted. The chamber 24 in the casing is preferably connected to either the pressure or the suction side of the pump by conventional means not herein illustrated.

The pressure differential between the chamber 24 and atmosphere influences in some respects the form and positioning of the elements of the seal 13, which in Figs 1 and 2 is illustrated in a form which contemplates connection of the chamber 24 with the suction side of the pump 12 so as to create a partial vacuum within the chamber 24.

Referring particularly to Fig. 2 of the drawing, the seal 13 comprises a bushing 25 fixed to and rotatable with the shaft 10 and engaged in an endwise direction by a non-rotatable seal ring 26 supported by a flexible diaphragm 27, the outer edge of which is clamped in a shouldered recess 28 in the end of the sleeve 23 by means of a nut 29. An expansive coil spring 30 acts between the nut 29 and the ring 26 to press the ring axially and maintain constant contact between an annular lapped face 31 on the ring 26 and the adjacent annular end surface on the bushing 25.

To prevent leakage of fluids, either liquid or gaseous, between the bushing 25 and the shaft 10, the bushing is preferably formed from relatively soft metal with a tapered outer surface 32 along which an internally tapered ring 33 of stronger metal may be driven axially to distort the bushing inwardly into leak-proof relation to the shaft. In the form illustrated in Fig. 2, the bushing is proportioned so that the end opposite its lapped face 31 abuts the end of the hub 22, and the outer surface is therefore tapered so that the clamping ring 33 is driven toward the hub 22.

In accordance with the present invention the diaphragm 27 is constructed from an extremely flexible non-elastic material such as a cloth or textile fabric which is more or less limp as compared with diaphragms of metallic or semi-rigid materials, so that the material in itself does not materially resist movement or oscillation of the seal ring. Being of a non-metallic character, such a diaphragm is free from internal stresses which tend to cause failure when the diaphragm is distorted at various angles. The material employed for the diaphragm 27 is entirely a textile fabric devoid of any rubber and is neither elastic nor resilient. The fabric is, in fact, known as airplane cloth, impregnated and otherwise treated so as to be fluid-proof, and is of such a character as to resist the harmful actions of the various liquids or gases with which the device is to be used. The diaphragm is necessarily non-elastic because friction tends to rotate the seal ring 26 and would thus distort an elastic diaphragm to a greater or lesser extent as the friction varied. This would cause oscillation of the seal ring 26 resulting in a chattering and breaking of the seal. An elastic material would also be attacked by oils and refrigerants. If desired, the fabric may be relatively thin, and a plurality of laminations thereof employed to form the diaphragm as in the embodiment illustrated.

The fabric of the diaphragm is centrally apertured to conform with the inner diameter of the seal ring 26, and is secured at its inner edge to the ring 26 in leak-proof relation by means such as a clamping bushing 34. The bushing 34 as shown herein has a flange 35 which is positioned between the diaphragm and the spring 30, with a tubular portion 36 which extends through the seal ring 26 in spaced relation to the shaft 10, and is interlocked with the ring 26 as by outward bending or riveting at 37 to hold the flange 35 and the ring 26 firmly clamped to the fabric of the diaphragm. In the flange 35, an annular recess 38 is formed which corresponds with a similar recess 39 in the nut 29 and serves with said recess 39 to maintain the spring 30 in position.

At its outer peripheral edge, the diaphragm 27 is preferably provided with a clamping and stiffening ring 40 comprising an internally facing annular channel formed from relatively soft metal, for example copper, and compressed upon the laminations of the fabric so as to hold the same together. The ring 40 serves in a measure to stiffen the outer edge of the diaphragm and to maintain the form of the diaphragm prior to and during its mounting in the shouldered recess 28, and in addition, the ring 40 acts as a gasket to prevent rupture of the diaphragm as the nut 29 is tightened.

The alternative embodiment of the invention illustrated in Fig. 3 of the drawing contemplates the connection of the chamber 24 with the pressure side of the pump 12, and the positions of the various elements of the seal 13 are therefore reversed so that the pressure differential tends to augment rather than oppose the action of the spring 30. Thus the seal ring assembly is reversed so that the lapped face 31 of the seal ring 26 faces outwardly of the casing, and the spring 30 acts between the clamping flange 34 and the hub 22. A bushing 41, generally similar to the bushing 25 is employed, having a lapped face opposing the adjacent face 31 of the seal ring 26, and with an outer surface 42 tapered so that clamping ring 43 may be driven along the surface toward the hub 22 to clamp the bushing in leak-proof relation to the shaft 10. A nut 44, also of a form similar to that used in the embodiment of Fig. 2, serves to clamp the outer edge of the diaphragm 27, the nut having a relatively large internal recess 45 to house the bushing 41 and its clamping ring 43.

The construction herein described has been found in practice to possess qualities of durability and wear resistance heretofore unattainable, due in a large measure to the extreme flexibility of the diaphragm and the light spring pressure required in connection therewith to maintain the sealing surfaces in effective contact. With such a light pressure between the seal ring and the opposed bushing, the wear is correspondingly reduced. The extreme flexibility, and the non-metallic and non-crystallizing character of the fabric diaphragm enables the seal ring to oscillate and shift to conform to the initial or worn condition of the opposed friction surfaces without danger of premature failure of the diaphragm. The seal is thus self alining and takes up automatically.

I claim as my invention:

1. In a machine having an apertured casing and a rotary shaft projecting through said aperture, the combination of a mechanical seal between said shaft and said casing comprising an exteriorly tapering bushing formed from relatively soft metal and encircling said shaft, a clamping ring forced endwise along said tapered surface of the bushing to fix the same to the shaft and prevent leakage of fluid between the shaft and the bushing, a seal ring encircling the shaft in spaced relation thereto and adapted for annular flat surface contact with said bushing in an endwise direction, an annular flexible diaphragm of impregnated fluid-proof fabric, a bushing for securing the inner edge of said diaphragm in leak-proof relation to said seal ring having a radial flange adapted to be disposed on one side of the diaphragm and a tubular portion extending through the diaphragm and the seal ring and securing the seal ring on the opposite side of the diaphragm to clamp the same therebetween, a spring urging the seal ring into contact with the bushing secured to the shaft, an annular ring encircling and clamped to the outer circumference of the diaphragm to maintain the same flat before installation, and means for securing the outer circumference of the diaphragm in the casing.

2. In a machine having an apertured casing and a rotary shaft projecting through said aperture, the combination of a mechanical seal between said shaft and said casing comprising a bushing fixed about and rotatable with the shaft and fitted to the shaft to prevent leakage of fluid therebetween, a seal ring encircling the shaft in spaced relation thereto and adapted for annular surface contact with said bushing in endwise direction, an annular flexible diaphragm of impregnated fluid-proof fabric, a bushing having a tubular portion extending through said diaphragm and into engagement with said seal ring and a radial flange disposed on the side of said diaphragm opposite said seal ring to clamp the diaphragm therebetween in leak-proof relation, a spring urging said seal ring into engagement with the bushing on the shaft, means for securing the outer periphery of the diaphragm in the casing in leak-proof relation and means clamped onto the outer periphery of the diaphragm to stiffen the same and to form a gasket protecting the diaphragm against injury by the means securing the same in the casing.

3. An assembly unit for a mechanical seal, said unit comprising a seal ring, a relatively limp fluid-proof fabric diaphragm of annular form secured along one edge to said ring in leak-proof relation, and an annular soft metal member clamped over the outer periphery of the diaphragm to maintain said diaphragm in a relatively flat form prior to installation and to protect the diaphragm against injury.

4. An assembly unit for a mechanical seal ring, said unit comprising a seal ring, a centrally apertured diaphragm formed from a plurality of laminations of flexible fluid-proof fabric, a bushing having a tubular portion extending through the central aperture of the diaphragm clamping the inner edges of the laminations together and securing the same to the seal ring in leak-proof relation and an annular device extending over the outer periphery of said diaphragm to clamp the outer edges of the laminations together before installation and to protect the diaphragm against injury.

GUNNAR A. WAHLMARK.